(12) United States Patent
Ebbesen et al.

(10) Patent No.: US 9,273,732 B2
(45) Date of Patent: Mar. 1, 2016

(54) BEARING WITH A SUPPORTING ELEMENT AND METHOD OF SUPPORTING A FIRST RING OF A BEARING

(71) Applicant: SIEMENS AKTIENGESELLSCHAFT, München (DE)

(72) Inventors: Henning Ebbesen, Skjern (DK); Akhilesh Shukla, Ikast (DK)

(73) Assignee: SIEMENS AKTIENGESELLSCHAFT (DE)

( * ) Notice: Subject to any disclaimer, the term of this patent is extended or adjusted under 35 U.S.C. 154(b) by 92 days.

(21) Appl. No.: 14/200,767

(22) Filed: Mar. 7, 2014

(65) Prior Publication Data

US 2014/0270612 A1    Sep. 18, 2014

(30) Foreign Application Priority Data

Mar. 13, 2013  (EP) .................................... 13158987

(51) Int. Cl.
| | |
|---|---|
| *F16C 35/00* | (2006.01) |
| *F03D 11/00* | (2006.01) |
| *F03D 1/06* | (2006.01) |
| *F16C 43/00* | (2006.01) |

(52) U.S. Cl.
CPC .............. *F16C 35/00* (2013.01); *F03D 1/0658* (2013.01); *F03D 1/0691* (2013.01); *F03D 11/0008* (2013.01); *F16C 43/00* (2013.01); *F05B 2240/54* (2013.01); *F05B 2260/30* (2013.01); *Y02E 10/721* (2013.01); *Y02E 10/722* (2013.01); *Y10T 29/49636* (2015.01)

(58) Field of Classification Search
CPC .............. F16C 2360/31; F16C 2300/14; F16C 35/045; F03D 11/0008
See application file for complete search history.

(56) References Cited

U.S. PATENT DOCUMENTS

| | | | | |
|---|---|---|---|---|
| 4,668,109 | A * | 5/1987 | Basso ........................... | 384/518 |
| 6,158,897 | A * | 12/2000 | Sivonen et al. ............... | 384/518 |
| 7,244,102 | B2 * | 7/2007 | Delucis ......................... | 416/156 |
| 7,927,019 | B2 * | 4/2011 | Yoshida et al. ............... | 384/512 |
| 8,764,300 | B2 * | 7/2014 | Errard et al. .................. | 384/452 |
| 2003/0147751 | A1 * | 8/2003 | Wobben ......................... | 416/174 |
| 2004/0240997 | A1 * | 12/2004 | Wobben ..................... | 416/132 B |
| 2008/0193295 | A1 | 8/2008 | Sautter et al. | |
| 2012/0027602 | A1 * | 2/2012 | Schubert ................... | 416/204 R |

FOREIGN PATENT DOCUMENTS

WO    2012080350 A1    6/2012

\* cited by examiner

*Primary Examiner* — Thomas R. Hannon
(74) *Attorney, Agent, or Firm* — Schmeiser Olsen & Watts LLP

(57) ABSTRACT

A bearing with a supporting element, wherein the bearing is suitable for connecting a rotor blade of a wind turbine with a hub of the wind turbine is provided. The bearing comprises a first ring, which is arranged and prepared to be connected with the hub, and a second ring, which is arranged and prepared to be connected with the rotor blade. The rotor blade is rotatable with regard to the hub around a rotor blade axis of rotation. Furthermore, the bearing comprises a supporting element for supporting the first ring, in particular against deformation. The supporting element is arranged and prepared to be attached to the first ring with a first fixing element and to the hub with a second fixing element. A method of supporting a first ring of a bearing is also provided.

13 Claims, 8 Drawing Sheets

BEARING WITH A SUPPORTING ELEMENT AND METHOD OF SUPPORTING A FIRST RING OF A BEARING

CROSS-REFERENCE TO RELATED APPLICATIONS

This application claims priority to EP Application No. 13158987.1, having a filing date of Mar. 13, 2013, the entire contents of which are hereby incorporated by reference.

FIELD OF TECHNOLOGY

The following relates to a bearing with a supporting element, wherein the bearing is suitable for connecting a rotor blade of a wind turbine with a hub of the wind turbine, and a method of supporting a first ring of a bearing.

BACKGROUND

A radial bearing, e.g. a bearing that controls axial motion, is exposed to considerable load and stress during operation. Additionally, it is desired that a bearing shall have a long lifetime and shall need small maintenance efforts. More specifically, a low friction of a bearing is typically targeted.

Radial bearings may for example be utilized in wind turbines. A radial bearing of a wind turbine may comprise a first stationary ring and a second rotatable ring. A radial bearing in a wind turbine is for example utilized for connecting a hub of the wind turbine and a rotor blade of the wind turbine. In this case, the bearing is typically prone to diverse forces, e.g. in axial and/or radial direction.

A problem commonly encountered in this context is therefore deformation, e.g. axial and/or radial run-out, of the radial bearing. Until now, various methods have been tried out for solving this problem:

Use of a bearing with a bigger and wider stationary ring;
Using more bolts, wherein the bolts fix or attach the stationary ring with the hub; and
Using bigger bolts at the connection between the stationary ring and the hub.

However, all these concepts are expensive if bearings are made of a special high strength, cost intensive steel, which is often needed, e.g. in blade bearings for wind turbines.

Another solution which has been proposed is a support of the stationary ring of the bearing. In the patent application WO 2012/080350, a hub of a wind turbine with supporting elements is disclosed. These supporting elements support an outer ring of a blade bearing, the blade bearing connecting the hub with a rotor blade of the wind turbine. The supporting elements are fixed to the outer ring via a preload device. A disadvantage of this proposed solution is installation of the supporting element which is complex and sophisticated.

Therefore, a need exists for an improved bearing. More specifically, an improved concept for supporting a first ring of the bearing, in particular against deformation, is targeted.

SUMMARY

An aspect relates to a bearing with a supporting element, wherein the bearing is suitable for connecting a rotor blade of a wind turbine with a hub of the wind turbine. The bearing comprises a first ring, which is arranged and prepared to be connected with the hub, and a second ring, which is arranged and prepared to be connected with the rotor blade. The rotor blade is rotatable with regard to the hub around a rotor blade axis of rotation. Furthermore, the bearing comprises a supporting element for supporting the first ring, in particular against deformation. The supporting element is arranged and prepared to be attached to the first ring with a first fixing element and to the hub with a second fixing element.

A wind turbine, which is a device that converts kinetic energy from wind into mechanical energy, comprises a tower, a nacelle, a rotor, a hub and one or several rotor blades. It is advantageous if the rotor blade is rotatable with regard to the hub, a feature that is referred to as blade pitch. A blade pitch control is a control system of a wind turbine which adjusts a blade pitch to keep rotor speed within operating limits as wind speed changes. Each rotor blade can thus be assigned to a rotor blade axis of rotation. The bearing according to embodiments of the invention can therefore beneficially be applied for connecting the rotor blade with the hub.

As a bearing, in particular, a blade bearing of a wind turbine, is exposed to considerable stress and load; thus, a supporting element for supporting the bearing against deformation is highly beneficial. Deformation comprises e.g. axial run-out and radial run-out. In the context of this patent application, "axial" and "radial" always refers to the rotor blade axis of rotation. "Axial run-out" refers to a deformation of a ring of the bearing in an axial direction. Analogously, "radial run-out" refers to a deformation of a ring of the bearing in a radial direction.

Advantages of a bearing with a supporting element are many-fold. On the one hand, friction of the blade bearing may be increased due to the supporting element of the blade bearing. On the other hand, the bearing is more stable and more robust and will thus deform less. As a consequence, it may be possible to reduce the size of the rings of the bearing as well as the number of bolts which connect a ring of the bearing with another component, such as the hub or the rotor blade. This all leads to a reduction of manufacturing costs.

As can be seen, there exists a number of differences and advantages of the bearing disclosed in this patent application compared to the solution presented in the document WO 2012/080350. Due to the fact that the supporting element may be simply attached to the first ring with a first fixing element and to the hub with a second fixing element, costs and efforts of manufacturing the first ring and/or the supporting element can be decreased. In other words, on the one hand, tolerances regarding drillings or holes into the first ring and the supporting element may be relatively large. On the other hand, a preload device as disclosed in the document mentioned above is not necessary with a bearing and a supporting element of the present application. This means that the supporting element does not need to be attached by means of the preload device. Instead, the supporting element is directly attached to the first ring and the hub.

Another advantage of the first fixing element results in an increase of the friction capacity between the first ring and the supporting element, due to having more fixing elements, such as bolts, involved.

Yet another advantage of the first fixing element is that it strengthens up the bearing locally and reduces the deformation of the first ring.

Finally, yet another advantage of the presence of the first fixing element is due to the fact that it is possible to place the supporting element explicitly at a location where it is desired. This might, for example, be a section of the first ring which is already deformed or which is particularly prone to deformation. This is advantageous compared to the state of the art with e.g. a welded connection between the supporting element and the first ring, where the relative location of the supporting element might be predetermined.

Embodiments are also directed towards the hub of the wind turbine itself, wherein the hub is arranged and prepared to be connected with a rotor blade, the rotor blade being rotatable with regard to the hub.

The supporting element may comprise one or more components. The supporting element may also comprise a whole ring which surrounds the first ring. In a first embodiment, the first ring may comprise a front face and an outer face and the first fixing element may attach the supporting element with the first ring via the outer face and/or the front face. The first ring and the second ring both may comprise an annular shape. This means that they may be idealized by an inner hollow cylinder and an outer hollow cylinder, respectively. However, it has to be born in mind that in practice the first ring and/or the second ring may have rims, edges, supplementary protrusions, etc. which make the first and/or the second ring divert from an idealized hollow cylinder.

The front face is directed towards the rotor blade. In other words, the front face may substantially be directed perpendicular to the rotor blade axis of rotation. The outer face may be adjacent to the front face. In other words, the outer face is a surface section which is radially most outward with regard to the rotor blade axis of rotation. In an exemplary embodiment, the front face may be substantially perpendicular to the outer face.

In a first alternative embodiment, the first fixing element attaches the supporting element with the first ring via the outer face. An advantage of this alternative embodiment is that the supporting element can be designed flush with the first ring. In other words, the supporting element does not protrude or outstand with regard to the first ring.

In a second alternative embodiment, the first fixing element attaches the supporting element with the first ring via the front face. An advantage of this alternative embodiment may be an increased stability and robustness of the attachment between the supporting element and the first ring. Another advantage of this alternative embodiment may be simpler manufacturing if the supporting element is attached with the first ring via the front face.

In a third alternative embodiment, the first alternative embodiment and the second alternative embodiment are combined. This leads to two fixing elements, one fixing element attaching the supporting element via the outer face and another fixing element attaching the supporting element via the front face.

In another embodiment, the bearing is characterized in that the supporting element may comprise an axial extension, a radial extension and a circumferential extension, and the second fixing element may traverse the supporting element along the axial extension. Embodiments of the supporting element can be described as a three-dimensional object. Therefore, an axial extension, a radial extension and a circumferential extension can be assigned to the supporting element. The term "circumferential" refers to a circumference of the first ring.

The supporting element may have a shape similar to a rectangular cuboid, e.g. a brick. The supporting element may comprise a first side, the first side being directed towards the outer face, and the first side may beneficially be slightly curved. In a preferable embodiment, the supporting element has a first side with a similar curvature as the outer face. Furthermore, the supporting element may also have a shape that cannot be described by a simple geometrical term.

In another embodiment, the first fixing element and/or the second fixing element may be a bolt or a screw. In this context, a bolt is meant to have no tip, while a screw is meant to comprise a tip. The first fixing element and/or the second fixing element may additionally also comprises a pin in order to additionally bear shear forces which are exerted on the supporting element.

In another embodiment, the first ring may be designed and arranged as an outer ring and the second ring may be designed and arranged as an inner ring. Alternatively, the first ring may be designed and arranged as an inner ring and the second ring may be designed and arranged as an outer ring. Regardless whether the first ring is the outer ring or the inner ring, one ring is stationary with regard to the hub and one ring is rotatable with regard to the hub. The stationary ring is connected with the hub and the rotatable ring is connected with the rotor blade. If the first and stationary ring is the outer ring, then the supporting element is located radially most outward compared to the first ring and the second ring. Analogously, if the first and stationary ring is the inner ring, then the supporting element is radially most inward located compared to the first ring and the second ring.

In an exemplary embodiment the hub may comprise a mounting flange where the second fixing element is attached therewith. The mounting flange may comprise drilling holes for attachment of the second fixing element. Furthermore, the mounting flange may have a circumferential extension and/or a radial extension which may be similar to the circumferential extension and the radial extension of the supporting element, respectively.

In an alternative embodiment, the supporting element may also be directly attached to the hub. In another exemplary embodiment the bearing may comprise a further supporting element. The further supporting element may be located substantially opposite to the supporting element.

It may be known before installation of the supporting element where, during operation, load and thus deformation of the bearing has its highest value. In this case, it is advantageous to place the supporting element in an area which is defined by a main load direction. In this context, the main load direction is referred to as a direction which is radially extending from the rotor blade axis of rotation and going through the area where the supporting element is located. It may be beneficial that more than the supporting element and the further supporting element are comprised by the bearing. For example, may it be beneficial to add a third supporting element and a fourth supporting element, the third and the fourth supporting element being substantially opposite to each other.

In another embodiment, the bearing may be arranged in a wind turbine. A wind turbine comprises a tower, a nacelle, a rotor, a hub and one or more rotor blades. It is beneficial to utilize a bearing with a supporting element for connecting the rotor blade with the hub.

Finally, embodiments of the invention are also directed towards a method of supporting a first ring of a bearing, wherein the bearing is suitable for connecting a rotor blade of a wind turbine with a hub of the wind turbine. The method comprises a provision of a supporting element for supporting the first ring, in particular against deformation; attachment of the supporting element to the first ring by means of a first fixing element; and attachment of the supporting element to the hub by means of a second fixing element.

In a first alternative embodiment, the supporting element is first attached to the first ring and subsequently attached to the hub. In a second alternative embodiment, the supporting element is first attached to the hub and subsequently attached to the first ring. It may be advantageous to attach the supporting element to the first ring in a so-called prefabrication step. This means that attachment of the supporting element to the first ring is already performed before the first ring itself is attached to the hub. By application of this prefabrication step, the last step of attaching the supporting element to the hub is only performed after the first ring is attached to the hub. This may facilitate assembly and mounting of the supporting element.

The aspects defined above and further aspects of the present invention are apparent from the examples of embodiment to be described hereinafter and are explained with reference to the examples of embodiment.

BRIEF DESCRIPTION

Embodiments of the invention will now be described, by way of example only, with reference to the accompanying drawings, wherein.

The illustration in the drawing is schematically. It is noted that for similar or identical elements in different figures, the same reference signs will be used.

DETAILED DESCRIPTION

Figure 1:
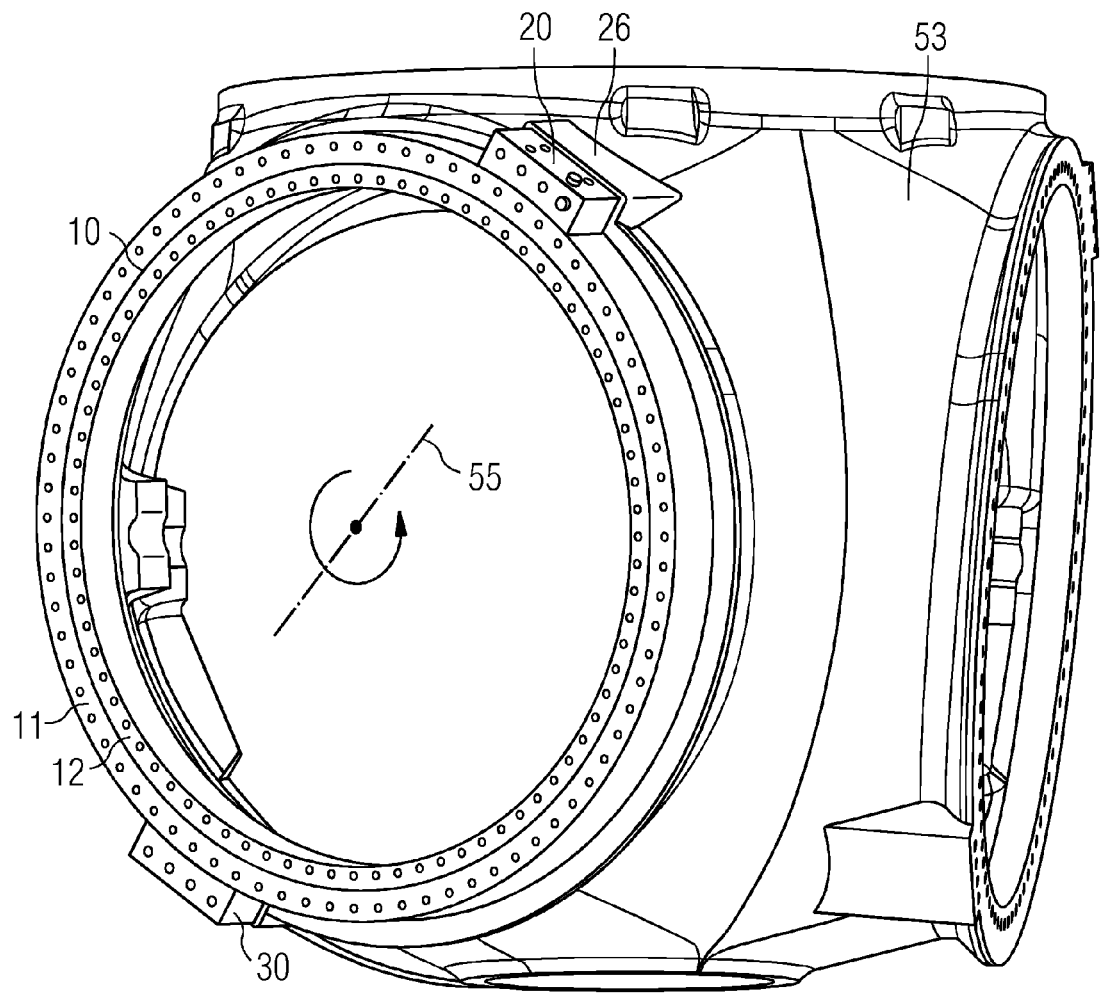
FIG. 1 shows a perspective view of an embodiment of a supporting element of a bearing in a first embodiment.

Referring to FIG. 1, a supporting element 20 of a bearing 10 in a first embodiment is shown. More specifically, a hub 53 of a wind turbine 50 as well as a bearing 10, attached to the hub 53, can be seen. The bearing 10 comprises a first ring 11 and a second ring 12. The first ring 11 is stationary with regard to the hub 53 and is attached to the hub 53. The second ring 12 is rotatable with regard to the hub 53 and is attached to a rotor blade 54 shown in FIG. 8. A rotor blade axis of rotation 55 is also depicted in FIG. 1. Additionally, a supporting element 20 that is attached to a mounting flange 26 of the hub 53 as well as a further supporting element 30 are depicted. The supporting element 20 is substantially opposite to the further supporting element 30.

Figure 2:
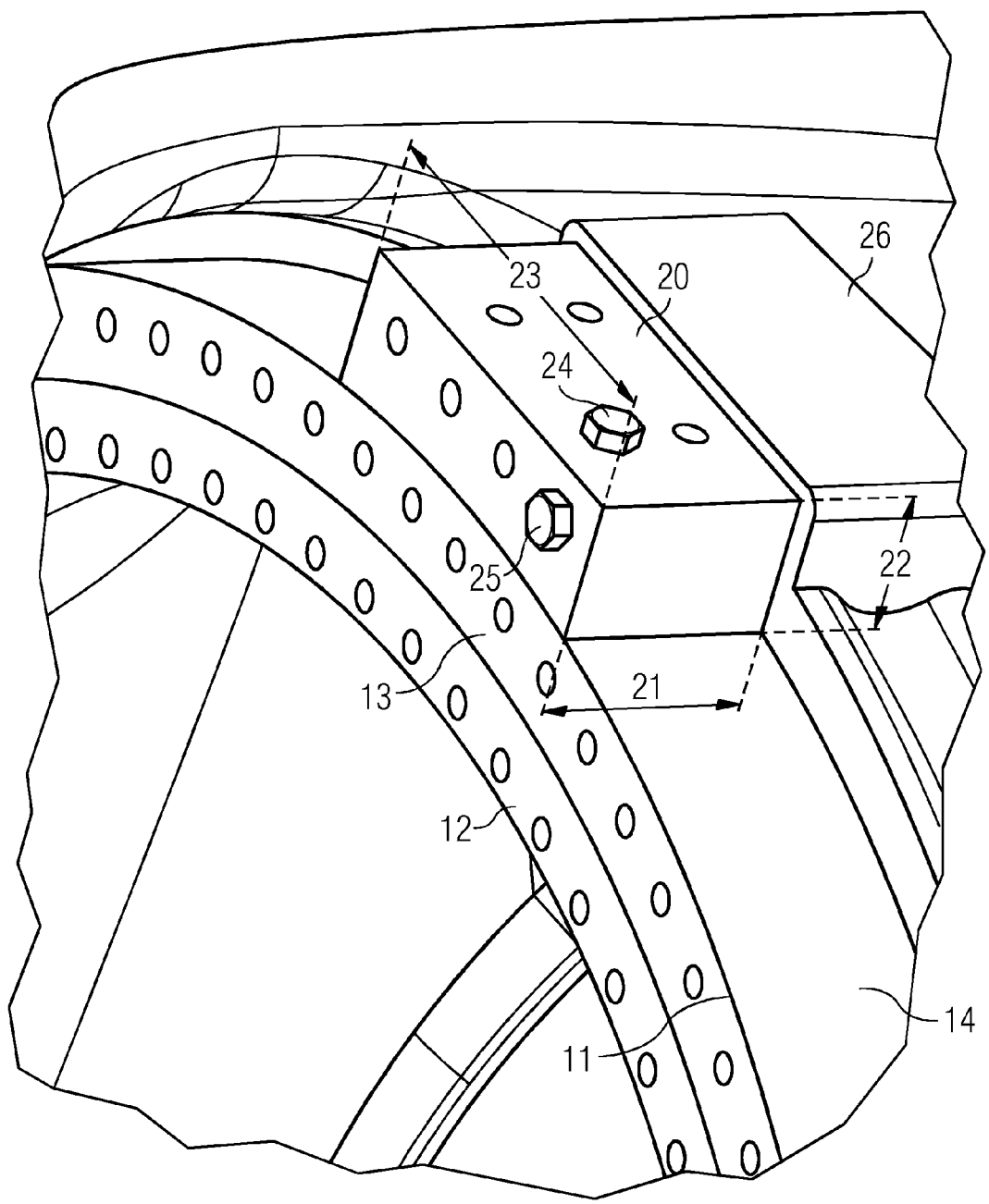
FIG. 2 shows a detailed view of an embodiment of the supporting element of the bearing in the first embodiment.

In FIG. 2, a detailed view of the supporting element 20 of the bearing 10 of the first embodiment is shown. The first ring 11 and the second ring 12 of the bearing can be seen. In more detail, the front face 13 and the outer face 14 of the first ring 11 are illustrated. In the exemplary embodiment shown in FIGS. 1 and 2, the front face 13 and the outer face 14 comprise an angle of approximately 90°. Furthermore, it can be seen that the first ring 11 as well as the second ring 12 comprise both a shape of a hollow cylinder. The supporting element 20 features an axial extension 21, a radial extension 22 and a circumferential extension 23. Furthermore, the supporting element 20 comprises a curved surface section which is adjacent to the outer face 14 and comprises a similar curvature as the outer face 14.

Furthermore, a first fixing element 24 attaching the supporting element 20 with the first ring 11 can be seen. It attaches the supporting element 20 with the first ring 11 via the outer face 14. Additionally, a second fixing element 25, which traverses the supporting element 20 along the axial extension and attaches the supporting element 20 with the hub 53 can be seen. More specifically, a second fixing element attaches the supporting element 20 with a mounting flange 26, which is part of the hub 53.

Figure 3:
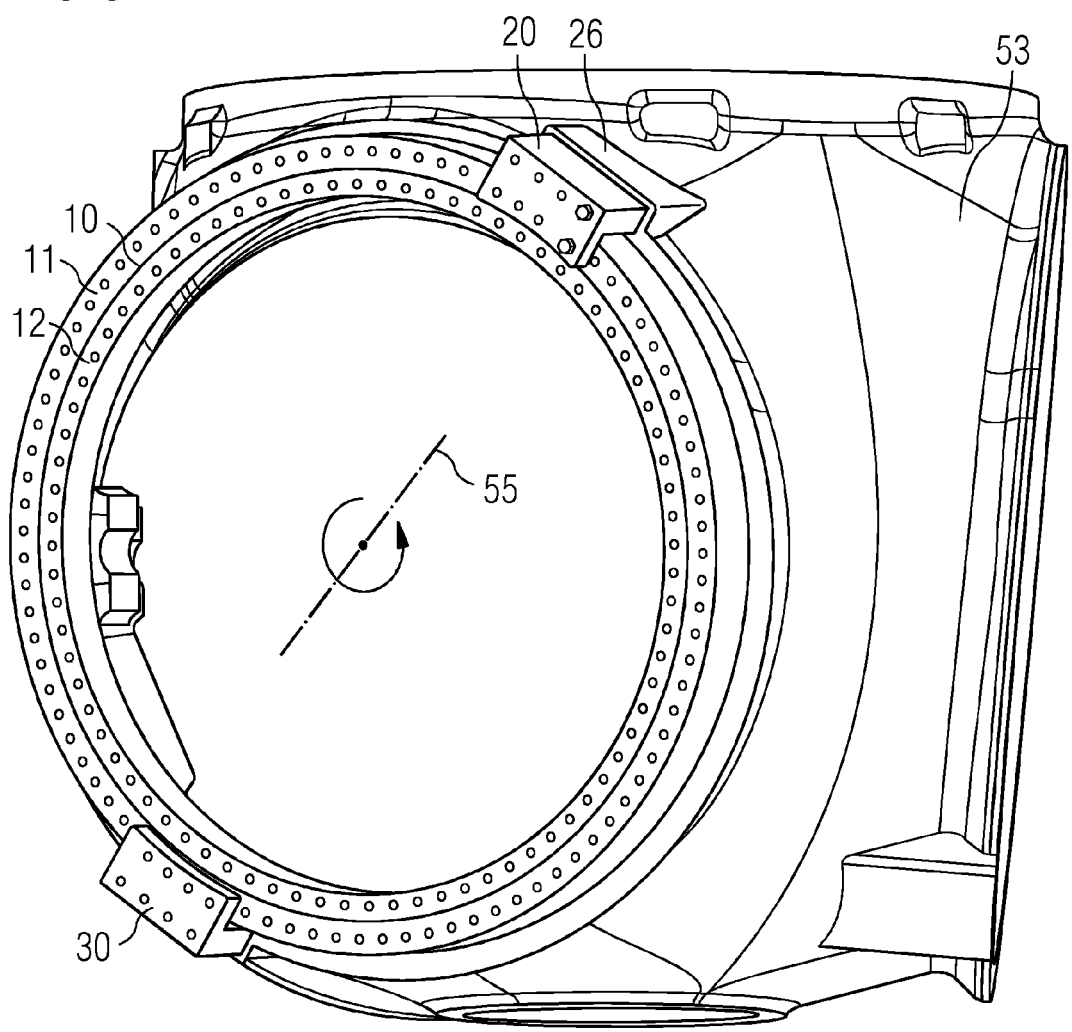
FIG. 3 shows a perspective view of an embodiment of a supporting element of a bearing in a second embodiment.

A second embodiment of a supporting element 20 of a bearing 10 is shown in FIG. 3. Again, a first ring 11 and a second ring 12 are shown. The first ring 11 is connected with a hub 53 of a wind turbine 50 and the second ring 12 is arranged and prepared to be connected with a rotor blade 54 of a wind turbine 50 shown in FIG. 8. A rotor blade axis of rotation 55 is also illustrated. By contrast to the first embodiment, the supporting element 20 has an angled shape. Analogously, a further supporting element 30, which is substantially opposite to the supporting element 20, has an angled shape, too. The supporting element 20 is attached to the hub 53 via a mounting flange 26.

Figure 4:
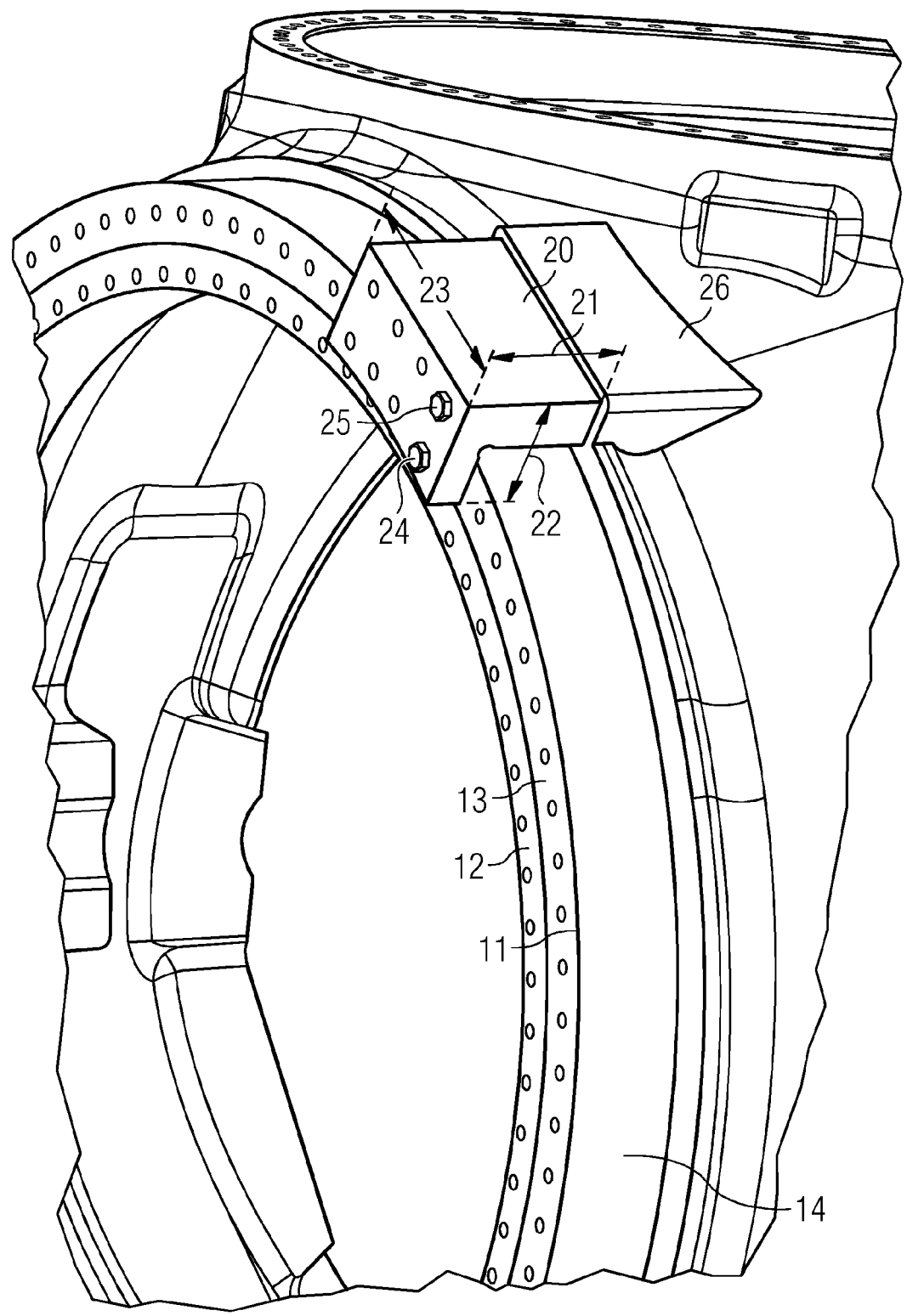
FIG. 4 shows a detailed view of an embodiment of the supporting element of the bearing in the second embodiment.

A detailed view of the second embodiment comprising the supporting element 20 of the bearing 10 is shown in FIG. 4. Also, the angled shaped supporting element 20, an axial extension 21, a radial extension 22, and a circumferential extension 23 are depicted. As can be seen, the radial extension 22 of the supporting element 20 varies. In this context, the radial extension 22 is referred to as a maximum radial extension 22 of the supporting element 20. The attachment of the supporting element 20 with a hub 53 and the first ring 11 is performed differently in the second embodiment compared to the first embodiment. While the second fixing element 25 similarly traverses the supporting element 20 along the axial extension 21, the first fixing element 24 attaches the supporting element 20 with the first ring 11 via the front face 13. This may be advantageous with regard to manufacturing. Furthermore, the angled supporting element 20 may have advantages with regard to stability and robustness compared to a brick-like supporting element 20 as shown in FIGS. 1 and 2.

Figure 5:
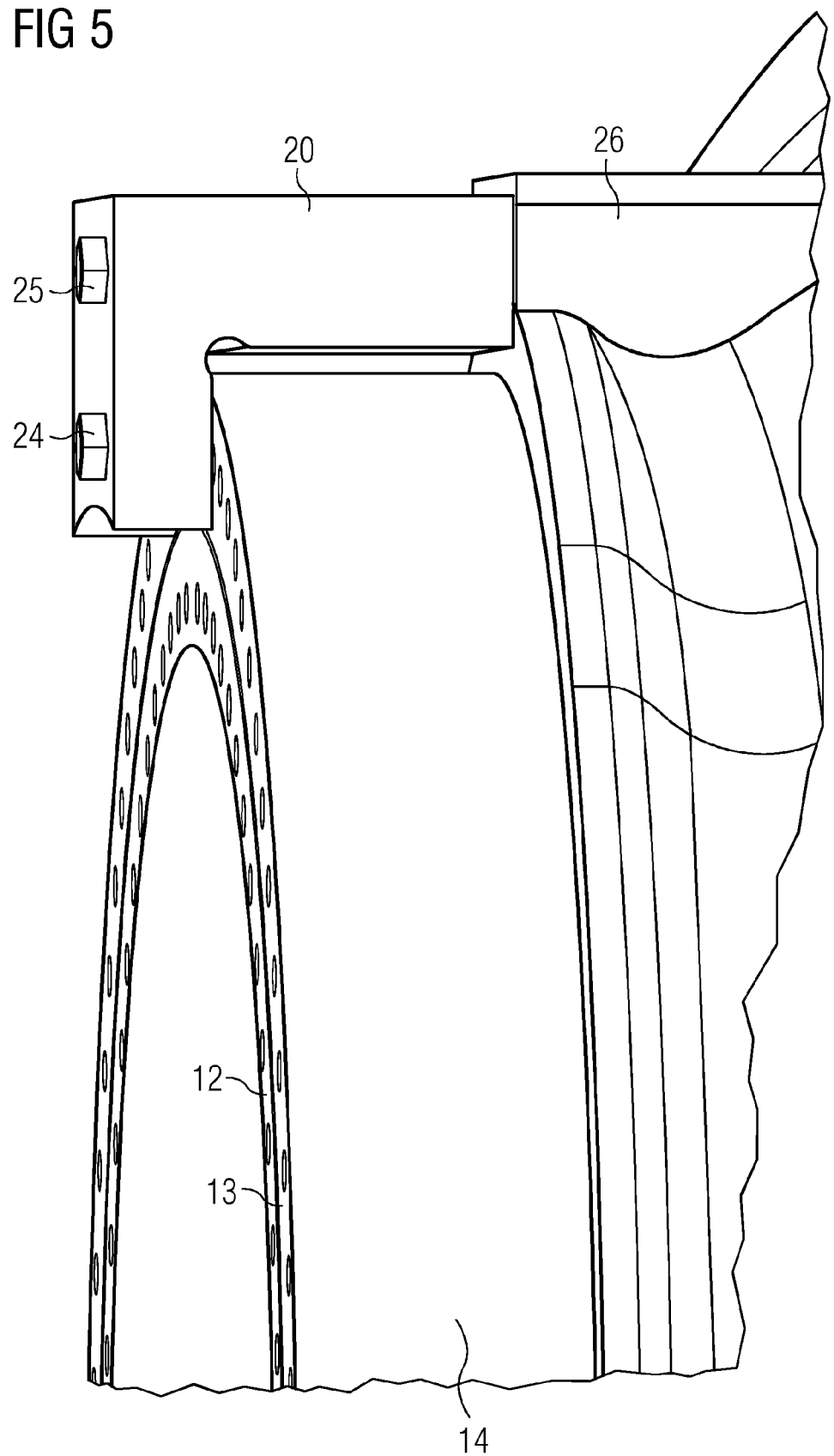
FIG. 5 shows another detailed view of an embodiment of the supporting element of the bearing in the second embodiment.

FIG. 5 shows another detailed view of the angled supporting element 20 of the bearing 10 of the second embodiment. It shows clearly how the angled supporting element 20 protrudes or outstands over the outer face 14 of the first ring 11. Furthermore, it can clearly be seen that the angled supporting element 20 has a curved side which is radially most inward with regard to the rotor blade axis of rotation 55.

Figure 6:
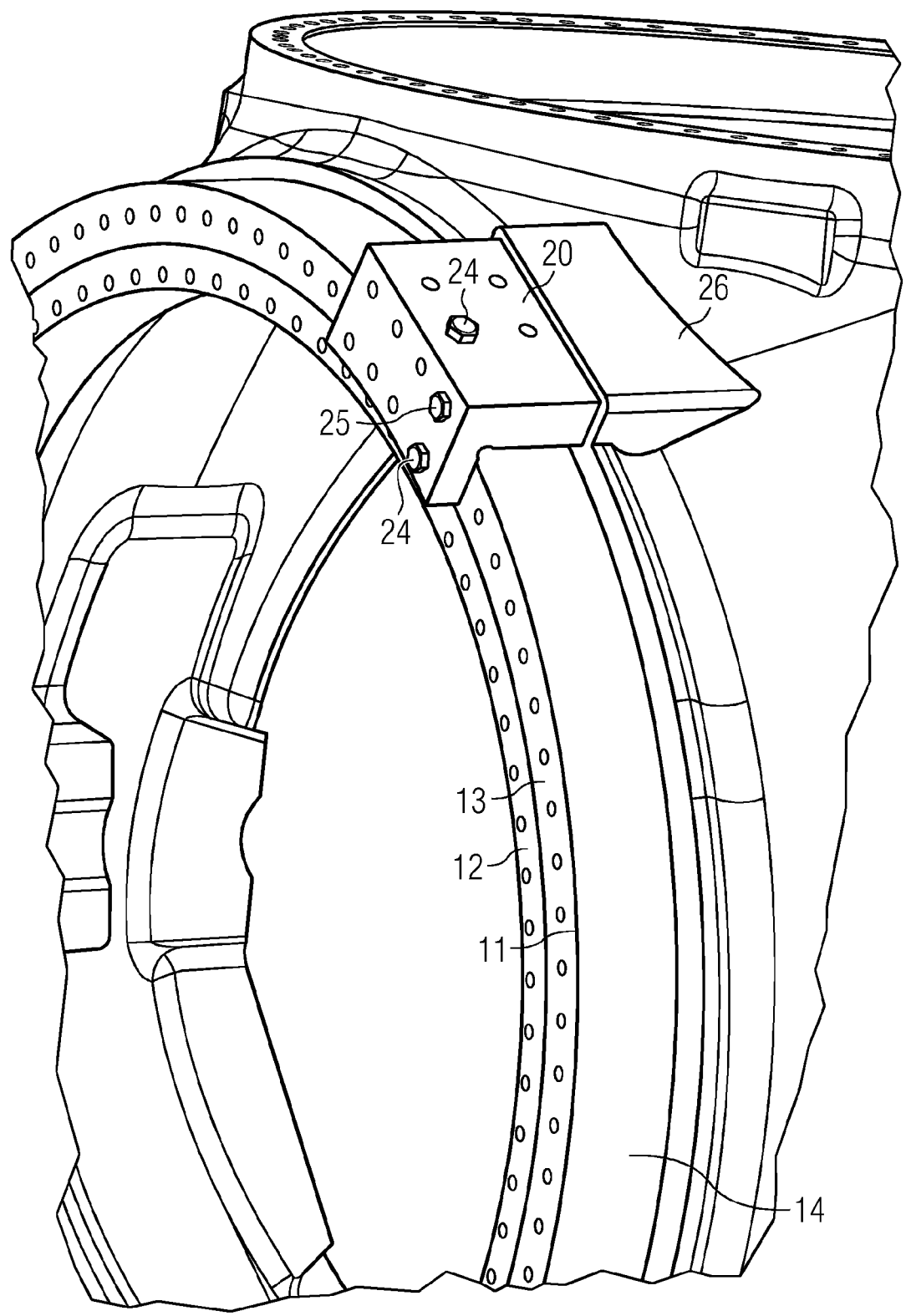
FIG. 6 shows a perspective view of an embodiment of a supporting element of a bearing in a third embodiment.

FIG. 6 shows a supporting element 20 of a bearing 10 in a third embodiment. The third embodiment actually is a combination of the first embodiment and the second embodiment with regard to the attachment of the supporting element 20 to the hub 53 and the first ring 11. As can been seen, the supporting element 20 according to the third embodiment comprises two first fixing elements 24. One first fixing element 24 connects the supporting element 20 with a first ring 11 via the outer face 14, and another first fixing element 24 connects the supporting element 20 with the first ring 11 via the front face 13. The third embodiment may be even more robust and stable as the first and/or the second embodiment. With regard to all described FIGS. 1 to 6, it shall be stressed that only a few bolts are exemplarily shown in the drawings. More fixing elements or bolts may be applied to enhance the stability of the attachment between the supporting element 20 and first ring 11 and the hub 53, respectively.

Figure 7:
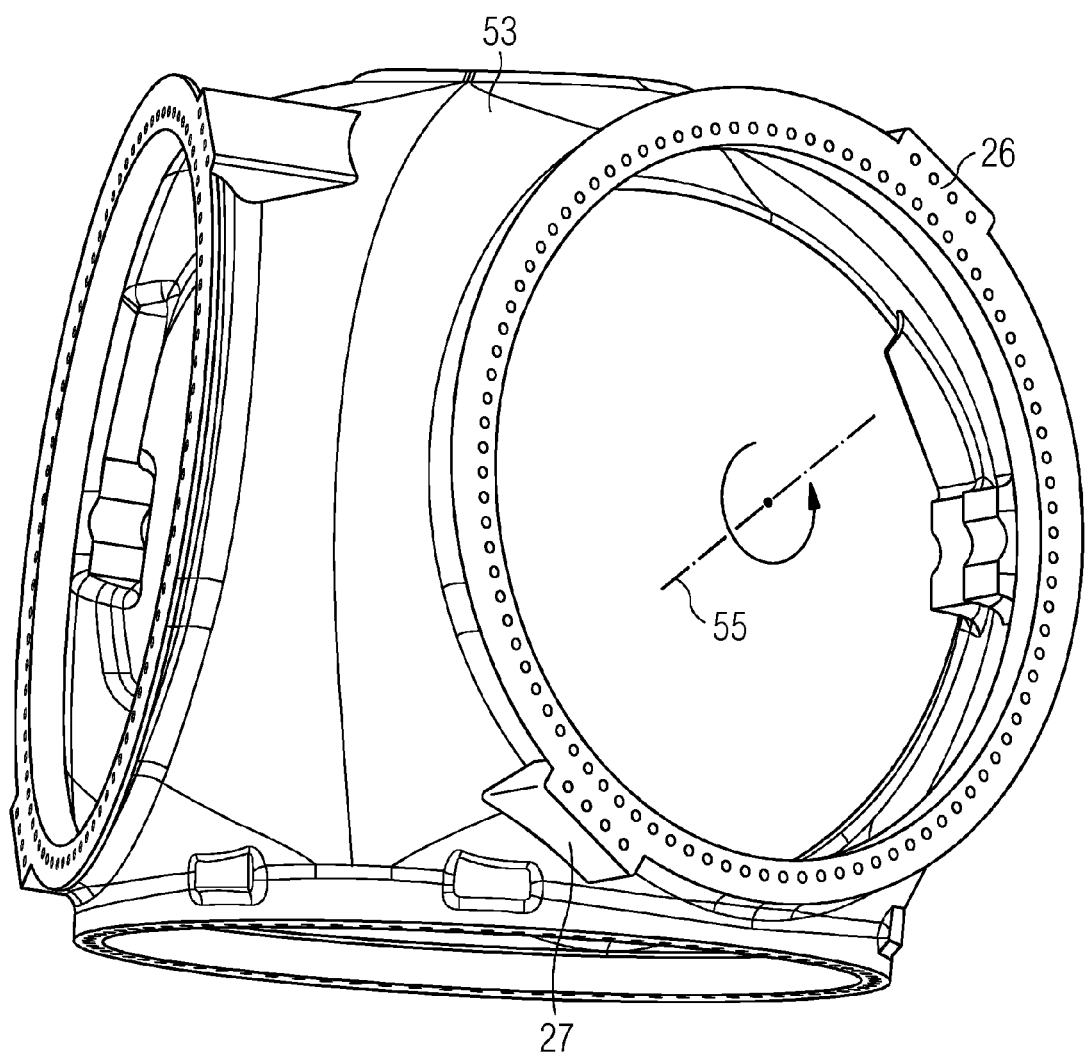
FIG. 7 shows a perspective view of an embodiment of a hub of a wind turbine with a mounting flange for a supporting element of a bearing.

FIG. 7 shows a hub 53 with a pair of mounting flanges. The pair of mounting flanges comprises a mounting flange 26 and a further mounting flange 27. As in this drawing, a bearing 10 is not yet connected to the hub 53, the mounting flange 26 and the further mounting flange 27 can be seen nicely. The mounting flange 26 can be fabricated as one piece together with the further mounting flange 27. In an alternative embodiment, however, the mounting flange 26 could also be fabricated separately from the further mounting flange 27.

Figure 8:
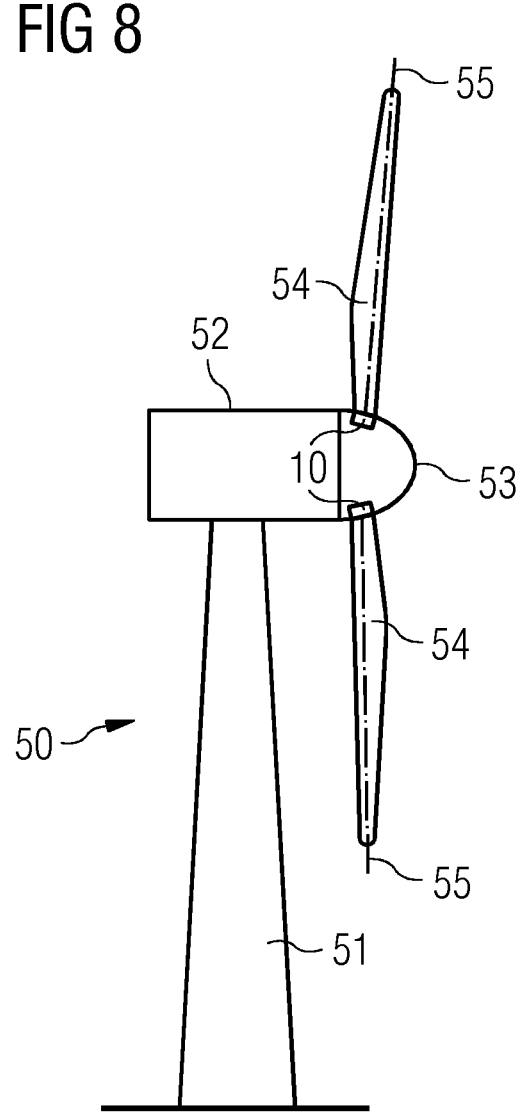
FIG. 8 shows a schematic view of an embodiment of a wind turbine with a bearing.

Finally, FIG. 8 shows a wind turbine 50 with a bearing 10. The wind turbine 50 comprises a tower 51, a nacelle 52 and a hub 53. Two rotor blades 54 are connected with the hub 53. Each rotor blade 54 is arranged such that it is rotatable around a rotor blade axis of rotation 55. In another exemplary embodiment, it may also be beneficial to have three rotor blades 54.

The invention claimed is:

1. A bearing, suitable for connecting a rotor blade of a wind turbine with a hub of the wind turbine, comprising:
   a first ring, which is arranged and prepared to be connected with the hub;
   a second ring, which is arranged and prepared to be connected with the rotor blade, the rotor blade being rotatable with regard to the hub around a rotor blade axis of rotation; and
   a supporting element for supporting the first ring against deformation, the supporting element being arranged and prepared to be attached to the first ring with a first, removable fixing element, and to the hub with a second fixing element.

2. The bearing according to claim 1, wherein the first ring comprises a front face and an outer face, and the first, removable fixing element attaches the supporting element with the first ring via the outer face and/or the front face.

3. The bearing according to claim 1, wherein the supporting element comprises an axial extension, a radial extension and a circumferential extension, and the second fixing element traverses the supporting element along the axial extension.

4. The bearing according to claim 1, wherein the first, removable fixing element is a bolt or a screw, and the second fixing element is a bolt or a screw.

5. The bearing according to claim 1, wherein the first ring is designed and arranged as an outer ring and the second ring is designed and arranged as an inner ring.

6. The bearing according to claim 1, wherein the hub comprises a mounting flange where the second fixing element is attached therewith.

7. The bearing according to claim 1, wherein the bearing comprises a further supporting element.

8. The bearing according to claim 7, wherein the supporting element is located substantially opposite to the further supporting element.

9. The bearing according to claim 1, wherein the bearing is arranged in a wind turbine.

10. A bearing, suitable for connecting a rotor blade of a wind turbine with a hub of the wind turbine, comprising:
    a first ring, which is arranged and prepared to be connected with the hub;
    a second ring, which is arranged and prepared to be connected with the rotor blade, the rotor blade being rotatable with regard to the hub around a rotor blade axis of rotation; and
    a supporting element for supporting the first ring against deformation, the supporting element being arranged and prepared to be attached to the first ring with a first fixing element, and to the hub with a second fixing element;
    wherein the supporting element includes a first end surface and a second end surface separated by a circumferential extension.

11. The bearing of claim 10, further comprising a further supporting element, the further supporting element being arranged and prepared to be attached to the first ring, wherein the further supporting element is spaced apart from the supporting element.

12. The bearing of claim 10, wherein the supporting element includes a curved surface section that is adjacent to an outer face of the first ring, the curved surface section extending between the first end surface and the second end surface.

13. A method of supporting a first ring of a bearing, wherein the bearing is suitable for connecting a rotor blade of a wind turbine with a hub of the wind turbine, the method comprising:
    providing a supporting element for supporting the first ring against deformation;
    attaching the supporting element to the first ring by means of a first, removable fixing element; and
    attaching the supporting element to the hub by means of a second fixing element.

* * * * *